US012562362B2

(12) United States Patent
Yoshikawa et al.

(10) Patent No.: US 12,562,362 B2
(45) Date of Patent: Feb. 24, 2026

(54) RECHARGEABLE BATTERY AND METHOD FOR MANUFACTURING POSITIVE PLATE OF RECHARGEABLE BATTERY

(71) Applicants: TOYOTA BATTERY CO., LTD., Kosai (JP); TOYOTA JIDOSHA KABUSHIKI KAISHA, Toyota (JP); PRIME PLANET ENERGY & SOLUTIONS, INC., Tokyo (JP)

(72) Inventors: Kazutaka Yoshikawa, Hamamatsu (JP); Shotaro Deguchi, Toyohashi (JP); Ryotaro Sakai, Toyohashi (JP); Yoshinori Kudo, Toyohashi (JP)

(73) Assignees: TOYOTA BATTERY CO., LTD., Kosai (JP); TOYOTA JIDOSHA KABUSHIKI KAISHA, Toyota (JP); PRIME PLANET ENERGY & SOLUTIONS, INC, Tokyo (JP)

( * ) Notice: Subject to any disclaimer, the term of this patent is extended or adjusted under 35 U.S.C. 154(b) by 614 days.

(21) Appl. No.: 18/072,599

(22) Filed: Nov. 30, 2022

(65) Prior Publication Data

US 2023/0178705 A1     Jun. 8, 2023

(30) Foreign Application Priority Data

Dec. 3, 2021     (JP) ................................. 2021-197138

(51) Int. Cl.
*H01M 4/04*          (2006.01)
*B05D 1/34*          (2006.01)
(Continued)

(52) U.S. Cl.
CPC ............ *H01M 4/0404* (2013.01); *B05D 1/34* (2013.01); *H01M 4/13* (2013.01); *H01M 4/366* (2013.01);
(Continued)

(58) Field of Classification Search
CPC ........ B05D 1/34; H01M 4/0404; H01M 4/667
See application file for complete search history.

(56) References Cited

U.S. PATENT DOCUMENTS

2020/0328427 A1* 10/2020 Yamada ................ H01M 4/624
2021/0036330 A1*  2/2021 Yoshida ............ H01M 10/0525

FOREIGN PATENT DOCUMENTS

| CN | 111799439 A | 10/2020 |
| JP | 2015-222657 A | 12/2015 |
| WO | 2015/156213 A1 | 10/2015 |

OTHER PUBLICATIONS

CN Office Action dated Nov. 28, 2025 in application No. 202211523874.6.

* cited by examiner

*Primary Examiner* — Susan D Leong
*Assistant Examiner* — Timothy G Hemingway
(74) *Attorney, Agent, or Firm* — Maschoff Brennan

(57)          ABSTRACT

A method for manufacturing a positive plate of a rechargeable battery includes producing an insulation protective paste forming an insulation protective layer of the positive plate, the insulation protective paste including insulation particles, a binder, and a solvent and having a pH adjusted corresponding to a zeta potential at which the insulation particles do not aggregate, producing a positive composite material paste forming a positive composite material layer of the positive plate, the positive composite material paste including a positive active material, a conduction support, a binder, and a solvent, and a pH adjuster being added to the positive composite material paste to adjust a pH corresponding to a zeta potential at which the insulation particles aggregate, and simultaneously coating a positive current collector of the positive plate with the positive composite
(Continued)

material paste and the insulation protective paste disposed adjacent to an end of the positive composite material paste.

7 Claims, 5 Drawing Sheets

(51) Int. Cl.

| | |
|---|---|
| *H01M 4/02* | (2006.01) |
| *H01M 4/13* | (2010.01) |
| *H01M 4/36* | (2006.01) |
| *H01M 4/62* | (2006.01) |
| *H01M 4/66* | (2006.01) |
| *H01M 10/04* | (2006.01) |
| *H01M 10/0525* | (2010.01) |
| *H01M 10/42* | (2006.01) |

(52) U.S. Cl.
CPC ............. *H01M 4/62* (2013.01); *H01M 4/667* (2013.01); *H01M 10/0525* (2013.01); *H01M 10/4235* (2013.01); *H01M 2004/028* (2013.01); *H01M 10/045* (2013.01)

RECHARGEABLE BATTERY AND METHOD FOR MANUFACTURING POSITIVE PLATE OF RECHARGEABLE BATTERY

BACKGROUND

1. Field

The following description relates to a rechargeable battery and a method for manufacturing a positive plate of a rechargeable battery, and more specifically, to a rechargeable battery and a method for manufacturing a positive plate of a rechargeable battery including an insulation protective layer that does not easily mix with a positive composite material layer.

2. Description of Related Art

A lithium-ion rechargeable battery is an example of a rechargeable battery, which is lightweight and has a high energy density, and is preferably used as, for example, a high-output power supply mounted on a vehicle. A typical rechargeable battery includes a positive electrode that is obtained by forming a positive composite material layer on a positive current collector and a negative electrode that is obtained by forming a negative composite material layer on a negative current collector. The positive electrode and the negative electrode are insulated by a separator or the like and stacked on one another. The stacked structure includes a power storing element, and the power storing element is rolled in a cylindrical or elliptic shape to form a rolled electrode body. The rolled electrode body is accommodated in a battery case. Such a rechargeable battery including the positive electrode and the negative electrode is typically designed so that the negative composite material layer is greater than the positive composite material layer in dimension in the width-wise direction to allow the negative electrode to have a larger capacity than the positive electrode. In this case, the negative composite material layer faces, via the separator, the positive current collector. Metal is exposed on the positive current collector in areas where the positive composite material layer is not formed. If fine metal powder collects on the negative composite material layer or metal deposits on the negative electrode, it may form a micro-short circuit with the positive current collector through the separator and produce heat.

To prevent such a short circuit, Japanese Laid-Open Patent Publication No. 2015-222657 and International Patent Publication No. WO2015/156213 disclose a positive current collector that includes an insulation protective layer containing an inorganic insulator. The insulation protective layer is formed on the surface of the positive current collector along an end of a positive active material layer. When the insulation protective layer is formed in this manner, the insulator covers a metal plate that forms the positive current collector. This effectively prevents short-circuiting with the negative composite material layer even in the presence of a foreign object such as fine metal powder.

Japanese Laid-Open Patent Publication No. 2015-222657 and International Patent Publication No. WO2015/156213 each describe a method for forming an insulation protective layer. However, the methods have the following shortcomings.

According to the invention described in Japanese Laid-Open Patent Publication No. 2015-222657, prior to formation of an insulation protective layer, paste for forming a positive composite material layer is applied and dried to form the positive composite material layer. Subsequently, paste for forming the insulation protective layer is applied to form the insulation protective layer.

In the method described in the invention of Japanese Laid-Open Patent Publication No. 2015-222657, the coating step of paste for forming the insulation protective layer is separate from the coating step of paste for forming the positive composite material layer. This increases the number of steps and requires a plurality of coating workstations. Thus, the amount of work is increased. In addition, the insulation protective layer and the positive composite material layer are applied to partially overlap each other so that a gap is not formed between the insulation protective layer and the positive composite material layer. However, the overlapped portion hampers an electrical connection between the positive composite material layer and the positive current collector and an exchange of ions between the positive composite material layer and the negative composite material layer. Since the positive composite material layer partially does not contribute to the battery efficiency, the positive composite material is inefficiently used.

In addition, the thickness of the boundary portion between the insulation protective layer and the positive composite material layer is increased. In particular, in the invention described in International Patent Publication No. WO2015/156213, the inorganic insulator is, for example, boehmite or alumina and has a high hardness and may cause wear in press rollers.

In International Patent Publication No. WO2015/156213, when an electrode substrate is fed at a predetermined speed, an electrode material is applied to the electrode substrate, and a first insulative material is also applied to portions adjacent to opposite sides of the electrode material in a direction orthogonal to the feeding direction of the electrode substrate. In addition, a second insulative material is applied to the surfaces of the electrode material and the first insulative material that have been applied. Subsequently, the applied electrode material and the applied first and second insulative materials are dried and adhered in a solid phase.

According to the invention described in International Patent Publication No. WO2015/156213, paste for forming the insulation protective layer and paste for forming the positive composite material layer are substantially simultaneously applied, simultaneously dried and adhered in a solid phase, and pressed. Thus, the coating is performed with a single workstation in a single step and thus requires a less amount of work. In addition, the boundary portion between the insulation protective layer and the positive composite material layer is less likely to include an overlap or a step.

However, in the invention described in International Patent Publication No. WO2015/156213, the paste for forming the insulation protective layer is mixed with the paste for forming the positive composite material layer in the boundary portion when applied. Ultimately, the positive composite material layer in the boundary does not contribute to the battery efficiency, and the positive composite material is inefficiently used.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

An aspect of the present disclosure is a method for manufacturing a positive plate of a rechargeable battery. The rechargeable battery includes an electrode body including the positive plate, a negative plate, and a separator that are stacked on one another. The negative plate includes a negative current collector and a negative composite material layer formed on the negative current collector. The positive plate includes a positive current collector, a positive composite material layer formed on the positive current collector, and an insulation protective layer formed on the positive current collector adjacent to the positive composite material layer at a position opposed to an end of the negative composite material layer. The method includes producing an insulation protective paste that forms the insulation protective layer, the insulation protective paste including insulation particles, a binder, and a solvent and having a pH adjusted corresponding to a zeta potential at which the insulation particles do not aggregate, producing a positive composite material paste that forms the positive composite material layer, the positive composite material paste including a positive active material, a conduction support, a binder, and a solvent, and a pH adjuster being added to the positive composite material paste to adjust a pH corresponding to a zeta potential at which the insulation particles aggregate, and simultaneously coating the positive current collector with the positive composite material paste and the insulation protective paste so that the insulation protective paste is disposed adjacent to an end of the positive composite material paste.

In the method described above, the insulation particles may include boehmite, and the pH of the insulation protective paste may be adjusted to 10 to 12.

In the method described above, the boehmite of the insulation protective paste may have an average particle size of 1 to 3 μm, and the insulation protective paste may be a dispersant-free insulation protective paste.

In the method described above, an amount of sodium (Na) contained in the insulation protective paste may be 50 to 500 ppm.

In the method described above, the pH adjuster may include acetic acid.

In the method described above, the pH of the positive composite material paste may be adjusted to 7 to 9.

In the method described above, the positive composite material paste may have an acidity of 300 to 800 ppm.

Another aspect of the present disclosure is a rechargeable battery that includes an electrode body including a positive plate, a negative plate, and a separator that are stacked on one another. The negative plate includes a negative current collector and a negative composite material layer formed on the negative current collector. The positive plate includes a positive current collector, a positive composite material layer formed on the positive current collector, and an insulation protective layer containing insulation particles and formed on the positive current collector adjacent to the positive composite material layer. The insulation protective layer includes a boundary portion that is in contact with the positive composite material layer. The insulation particles are aggregated more in the boundary portion than in a portion of the insulation protective layer differing from the boundary portion.

In the rechargeable battery described above, the insulative particles may include boehmite.

In the rechargeable battery described above, an amount of Na contained in the insulation protective layer may be 150 to 1700 ppm.

In the rechargeable battery described above, the rechargeable battery may include a lithium-ion rechargeable battery.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

Overview of Present Embodiment

A nonaqueous electrolyte rechargeable battery and a method for manufacturing a nonaqueous electrolyte rechargeable battery according to the present disclosure will now be described based on embodiments of a lithium-ion rechargeable battery and a method for manufacturing the lithium-ion rechargeable battery with reference to FIGS. 1 to 8.

Principle of Present Embodiment

Problem in Prior Art

Figure 9:
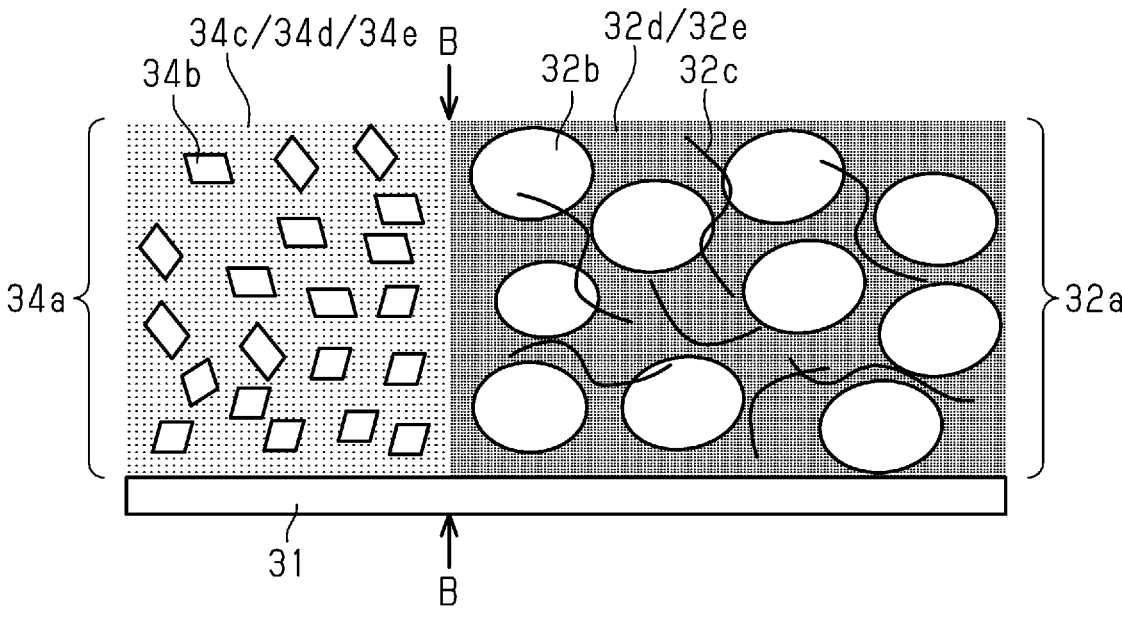
FIG. 9 is a schematic diagram showing a boundary portion between a positive composite material layer and an insulation protective layer in a coating step of a prior art.
Figure 10:
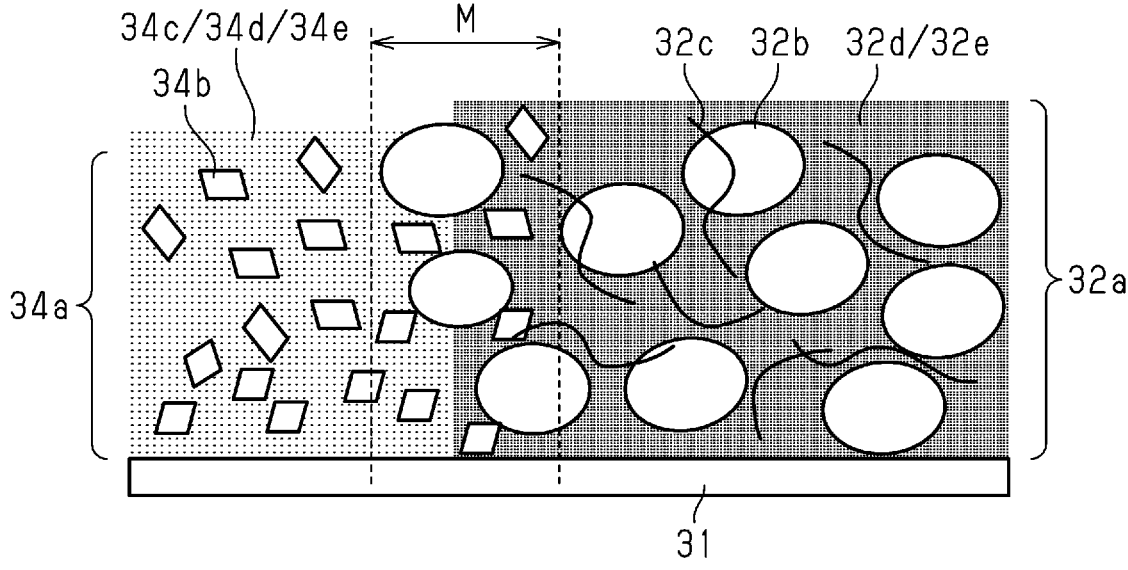
FIG. 10 is a schematic diagram showing the boundary portion between the positive composite material layer and the insulation protective layer after the coating step in the prior art.

FIG. 9 is a schematic diagram showing a boundary portion B between a positive composite material layer 32 and an insulation protective layer 34 in a coating step of the prior art. FIG. 10 is a schematic diagram showing the boundary portion B between the positive composite material layer 32 and the insulation protective layer 34 after the coating step in the prior art.

As described in the prior art section, in the invention described in International Patent Publication No. WO2015/156213, as shown in FIG. 9, in the coating step, a positive composite material paste 32a and an insulation protective paste 34a are simultaneously applied so that the positive composite material layer 32 and the insulation protective layer 34 are simultaneously formed. However, in the invention described in International Patent Publication No. WO2015/156213, as shown in FIG. 10, a mixed portion M is formed in the boundary portion B between the insulation protective paste 34a and the positive composite material paste 32a. The mixed portion M of the positive composite material layer 32 does not contribute to the battery performance, and the positive composite material is inefficiently used. This adversely affects the battery efficiency.

Cause of Problem in Prior Art

Immediately after being applied, the positive composite material paste 32a and the insulation protective paste 34a each have a high fluidity and are easily mix with each other in the boundary portion B. In particular, for example, boehmite forming insulation particles 34b of the insulation protective paste 34a has an average particle size of 1 to 3 μm, which is smaller than an average particle size of positive active material particles 32b that is 3 to 6 μm. Thus, the insulation particles 34b easily enter space between positive active material particles 32b and further easily mix with the positive active material particles 32b. In the prior art, a dispersant is added to inhibit aggregation of the insulation particles 34b. The dispersant further facilitates the mixing.

Principle of Present Embodiment

In the present embodiment, in the step of simultaneously applying the positive composite material paste 32a and the insulation protective paste 34a, when the positive composite material paste 32a comes into liquid contact with the insulation protective paste 34a in the boundary portion B, the insulation particles 34b, which are formed of boehmite contained in the insulation protective paste 34a, are aggregated to increase the apparent particle size. This inhibits entrance of the insulation particles 34b into space between the positive active material particles 32b and a conduction support 32c and entrance of the positive active material particles 32b and the conduction support 32c into space between the insulation particles 34b.

In this regard, acetic acid 32f is added to the positive composite material paste 32a as a pH adjuster so that when the positive composite material paste 32a comes into liquid contact with the insulation protective paste 34a in the boundary portion B, boehmite is aggregated to increase the apparent particle size. Since the positive composite material paste 32a has a low pH because of the acetic acid, when the positive composite material paste 32a comes into liquid contact with the insulation protective paste 34a in the boundary portion B, the pH of the insulation protective paste 34a becomes closer to the isoelectric point. As a result, boehmite aggregates. This inhibits the positive composite material paste 32a from mixing with the insulation protective paste 34a.

Satisfaction Condition of Present Embodiment

Two conditions need to be satisfied in order to accomplish the operation described above.

The first condition is that the insulation particles 34b, which are formed of boehmite contained in the insulation protective paste 34a, are not aggregated and uniformly dispersed before the positive composite material paste 32a comes into liquid contact with the insulation protective paste 34a in the boundary portion B in the simultaneous coating step.

The second condition is that in the simultaneous coating step, when the positive composite material paste 32a comes into liquid contact with the insulation protective paste 34a in the boundary portion B, the insulation particles 34b, which are formed of boehmite contained in the insulation protective paste 34a, aggregate.

First Condition: Boehmite "Dispersion"

It is known that the aggregation and dispersion of the insulation particles 34b are determined by zeta potential.

Zeta Potential

The potential of an electrically neutral region that is sufficiently separated from particles is defined as zero. The zeta potential is defined as the potential that is measured at a slipping plane when the zero point is used as the reference. In the case of fine particles, an increase in the absolute value of the zeta potential increases a repulsion force between the particles. This increases the stability of the particles and easily disperses the particles. On the other hand, when the zeta potential is close to zero, the particles tend to aggregate. In the present embodiment, the zeta potential is adjusted as an index of the dispersion stability of dispersed particles.

Isoelectric Point of Boehmite

Boehmite, which is the insulation particles 34b of the present embodiment, needs to be aggregated in the boundary portion B but should not be aggregated in the remaining portion. A change in the pH of the solution changes the zeta potential of an inorganic oxide particle. It is known that boehmite has an isoelectric point such that the surface potential becomes zero when the pH is 7.7 to 9.4. When the pH is close to the isoelectric point, the electrostatic repulsion force disappears, and the particles are easily aggregated. Therefore, the pH needs to differ from the isoelectric point enough to stabilize the dispersed state. That is, prior to the coating, the insulation protective paste 34a needs to have a pH differing from the pH of 7.7 to 9.4, which is close to the isoelectric point.

In the present embodiment, the insulation protective paste 34a does not include a dispersant. Therefore, this condition is particularly important.

Setting Satisfying First Condition

In the present embodiment, the average particle size of boehmite is 1 to 3 μm, which is set not to be too small, and the insulation protective paste 34a does not include a dispersant. Thus, the insulation protective paste 34a in the original state, more specifically, in a state before the insulation protective paste 34a comes into liquid contact with the positive composite material paste 32a in the boundary portion B, has a satisfactory dispersion stability. When the insulation protective paste 34a comes into liquid contact with the positive composite material paste 32a in the boundary portion B, boehmite contained in the insulation protective paste 34a is aggregated. From the viewpoint of the dispersion stability, the pH of the insulation protective paste 34a in the original state is adjusted to 10 to 12.

pH Adjustment of Insulation Protective Paste 34a

There are various processes for producing boehmite. Typically, boehmite is produced by performing hydrothermal treatment on aluminum hydroxide derived from bauxite, which is the raw material. The producing process includes a step of stirring and mixing a slurry obtained by adding water to aluminum hydroxide and a reaction accelerator (metal compound), a hydrothermal treatment step of wet-curing the slurry while heating the slurry in a steam atmosphere with a pressure vessel, and dehydrating step, a washing step, a filtering step, and a drying step of the product obtained by the reaction (see, for example, Japanese Laid-Open Patent Publication Nos. 6-263437 and 2000-86235). In a conventional process for producing boehmite through hydrothermal treatment, hydroxide, oxide, chloride, or sulfate of alkaline earth metal or alkali metal is added to aluminum hydroxide as a reaction accelerator. Therefore, the washing step is essential. However, even after the washing step, impurities derived from the reaction accelerator such as sodium (Na) and calcium (Ca) are likely to remain.

In this regard, in the present embodiment, the amount of Na in the insulation protective paste 34a is adjusted to 50 to 500 ppm, more preferably, 260 to 355 ppm so that the pH of the insulation protective paste 34a in the original state is adjusted to 10 to 12. In an example, when the insulation protective paste 34a includes boehmite of 25 wt %, the amount of Na in boehmite is adjusted to 200 to 2000 ppm. As a result, in a completed rechargeable battery, the amount of Na in the insulation protective layer 34 is 150 to 1700 ppm.

Second Condition: Boehmite "Aggregation"

The second condition is that when the insulation protective paste 34a is applied, the dispersed insulation particles 34b are aggregated in the boundary portion B. As described above, when the pH of boehmite is 7.7 to 9.4, the pH is close to the isoelectric point of boehmite. Therefore, the positive composite material paste 32a, which will liquid-contact the insulation protective paste 34a, needs to have a highly acidic pH.

pH Adjuster

Preferably, a pH adjuster that causes the positive composite material paste 32a to have a highly acidic pH is an acidic substance. Examples of the acidic substance include acetic anhydride, formic acid, propionic acid, and succinic acid.

In the present embodiment of the process for aggregating boehmite, the acetic acid 32f is added to the positive composite material paste 32a. When the positive composite material paste 32a comes into liquid contact with the insulation protective paste 34a, electrostatic repulsion force of boehmite is decreased so that boehmite is aggregated. The acetic acid 32f includes acetic anhydride and glacial acetic acid. In the present embodiment, acetic acid is selected based on the following reason.

According to Japanese Laid-Open Patent Publication No. 2019-075273, it is known that the properties of a nonaqueous electrolyte rechargeable battery are adversely affected by decomposition of the nonaqueous electrolyte. In this regard, the product of a specific surface area ($m^2/g$) of the positive active material and a mass percent (%) of the positive active material in the positive composite material layer 32 is set to be in a fixed range. Also, the amount of acetic anhydride contained in the positive composite material layer 32 is set to be within a fixed range. The setting produces the viscosity decrease effect of the positive composite material paste 32a at the time of manufacturing the positive plate. Thus, the paste has a satisfactory stability and satisfactory coating characteristics. This improves the productivity of nonaqueous electrolyte rechargeable batteries. In addition, decomposition of components (in particular, $Li_3PO_4$) that form a film on the positive active material surface is facilitated. This lowers the resistance of the positive electrode, thereby increasing the output of the nonaqueous electrolyte rechargeable battery at a low temperature. Addition of a fixed amount of the acetic acid 32f to the positive composite material paste 32a produces nonaqueous electrolyte rechargeable batteries that output excellent power at a low temperature at a high productivity in addition to its role in adjusting the pH. The addition of the acetic acid 32f produces no adverse effect.

Adjustment of pH and Acidity of Positive Composite Material Paste 32a

As described above, the pH of the positive composite material paste 32a is adjusted to 7 to 9 by the pH adjuster (in the present embodiment, acetic acid 32f). The acidity is adjusted to 300 to 800 ppm. As a result, when the positive composite material paste 32a comes into liquid contact with the insulation protective paste 34a in the boundary portion B, boehmite is aggregated to increase the apparent particle size. The increase in the apparent particle size of boehmite inhibits the positive composite material paste 32a from mixing with the insulation protective paste 34a.

Structure of Lithium-Ion Rechargeable Battery 1

Figure 1:
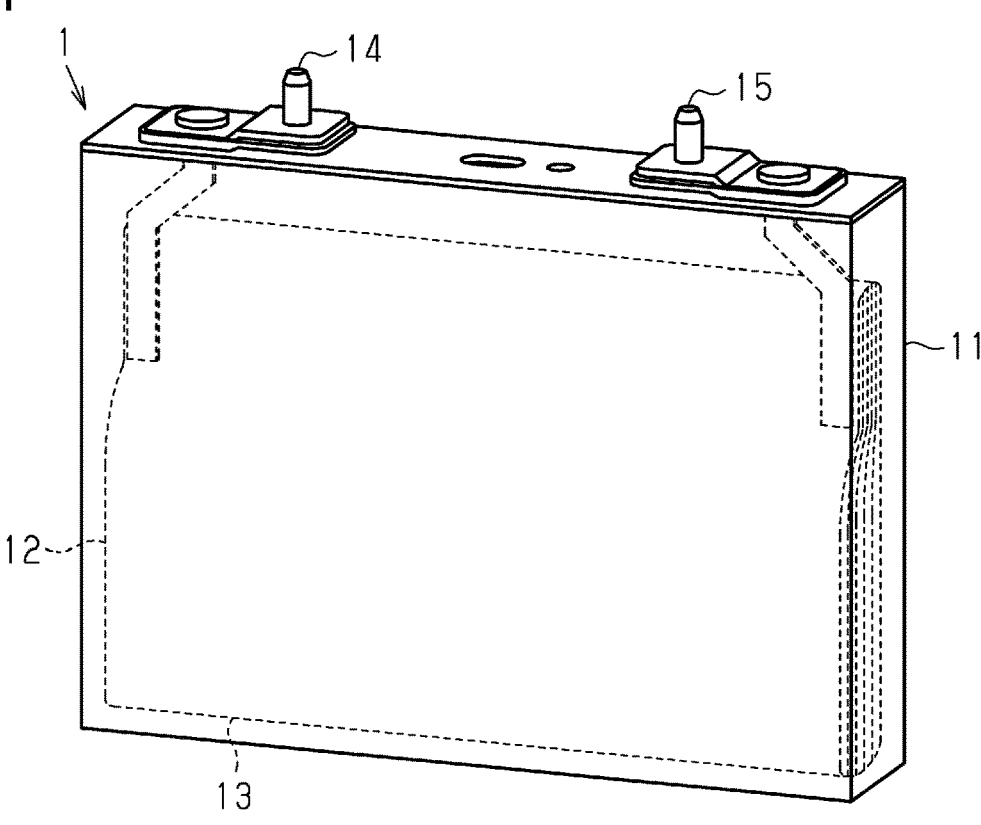
FIG. 1 is a schematic perspective view showing the structure of a lithium-ion rechargeable battery in an embodiment.

FIG. 1 is a schematic perspective view showing the structure of a lithium-ion rechargeable battery in the present embodiment. The structure of the lithium-ion rechargeable battery of the present embodiment will now be described.

As shown in FIG. 1, a lithium-ion rechargeable battery 1 includes a cell battery. The lithium-ion rechargeable battery 1 includes a rectangular-box-shaped battery case 11 having an upper opening. The battery case 11 accommodates an electrode body 12. The battery case 11 is filled with an electrolytic solution 13 through a liquid inlet. The battery case 11 is formed of metal such as an aluminum alloy and includes a hermetic battery container. The lithium-ion rechargeable battery 1 further includes a positive external terminal 14 and a negative external terminal 15 that are used when charging and discharging power. The shapes of the positive external terminal 14 and the negative external terminal 15 are not limited to those shown in FIG. 1.

Electrode Body 12

Figure 2:
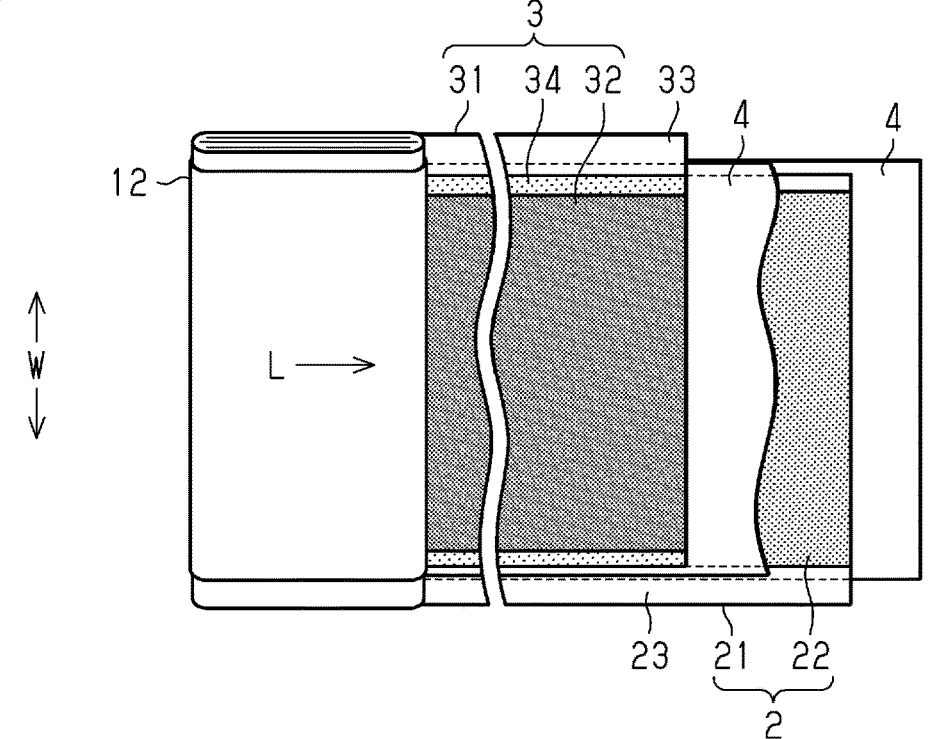
FIG. 2 is a schematic diagram showing the structure of an electrode body of the embodiment.

FIG. 2 is a schematic diagram showing the structure of the rolled electrode body 12. The electrode body 12 includes a negative plate 2, a positive plate 3, and a separator 4 disposed between the negative plate 2 and the positive plate 3 that are rolled and flattened. The negative plate 2 includes a negative current collector 21, which serves as a substrate, and a negative composite material layer 22 formed on the negative current collector 21. A negative connector 23 is disposed at one end in a width-wise direction W (roll axial direction) that is orthogonal to a rolling direction (roll direction L). The negative connector 23 is free of the negative composite material layer 22 and exposes the negative current collector 21. The direction in which the electrode body 12 (the negative plate 2, the positive plate 3, and the separator 4) is rolled is referred to as the roll direction L of the electrode body 12. The direction orthogonal to the roll direction L of the electrode body 12 is referred to as the width-wise direction W (roll axial direction) of the electrode body 12. The negative plate 2 includes the negative connector 23, which is disposed on one end of the negative plate 2 in the width-wise direction W (roll axial direction) of the electrode body 12. The negative composite material layer 22 is not formed on the negative current collector 21 of the negative connector 23. Thus, the negative current collector 21 is exposed on the negative connector 23.

The positive plate 3 includes a positive current collector 31, which serves as a substrate, and the positive composite material layer 32 formed on the positive current collector 31. A positive connector 33 is disposed at the other end (opposite to the negative connector 23) in the width-wise direction W (roll axial direction), which is orthogonal to the direction in which the positive current collector 31 is rolled (the roll direction L). In other words, the positive plate 3 includes the positive connector 33 disposed at an end of the positive plate 3 opposite to the negative connector 23 of the negative plate 2 in the width-wise direction W (roll axial direction) of the electrode body 12. The positive composite material layer 32 is not formed on the positive current collector 31 of the positive connector 33 so that the metal of the positive current collector 31 is exposed.

In the present embodiment, the positive plate 3 further includes the insulation protective layer 34 that is disposed adjacent to the end of the positive composite material layer 32 and opposed to the negative composite material layer 22. The direction orthogonal to the roll direction L and the width-wise direction W (roll axial direction) of the electrode body 12 is referred to as the thickness-wise direction of the electrode body 12. The positive plate 3 includes the insulation protective layer 34 disposed on the positive current collector 31. The insulation protective layer 34 is adjacent to the end of the positive composite material layer 32 in the width-wise direction W (roll axial direction) of the electrode body 12 and is opposed to the negative composite material layer 22 in the thickness-wise direction of the electrode body 12. In an example, the insulation protective layer 34 may be disposed on two parts of the positive current collector 31 adjacent to opposite ends of the positive composite material layer 32 in the width-wise direction W of the electrode body 12. In an example, the insulation protective layer 34 may be disposed on the positive current collector 31 between the positive connector 33 and the positive composite material layer 32 in the width-wise direction W of the electrode body 12. The insulation protective layer 34 is disposed to cover the exposed positive current collector 31.

Lamination of Electrode Body 12

Figure 3:
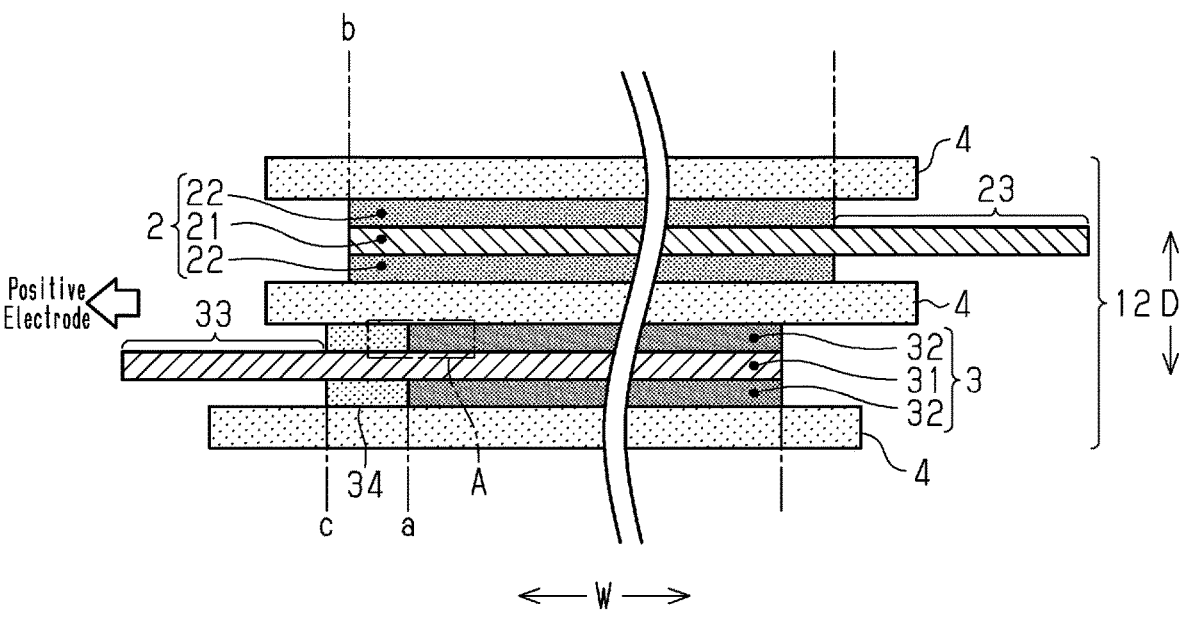
FIG. 3 is a cross-sectional view showing a portion of the structure of the electrode body in the embodiment.

FIG. 3 is a cross-sectional partial view showing the schematic structure of the lamination of the electrode body 12 in the lithium-ion rechargeable battery 1. As shown in FIG. 3, the basic structure (lamination) of the electrode body 12 in the lithium-ion rechargeable battery 1 includes the negative plate 2, the positive plate 3, and the separator 4.

The negative plate 2 includes the negative composite material layers 22 disposed on opposite surfaces of the negative current collector 21, which serves as a negative substrate. One end of the negative current collector 21 includes the negative connector 23 on which metal is exposed. More specifically, one end of the negative current collector 21 in the width-wise direction W of the electrode body 12 is used as the negative connector 23 on which metal is exposed.

The positive plate 3 includes the positive composite material layers 32 disposed on opposite surfaces of the positive current collector 31, which serves as a positive substrate. One end of the positive current collector 31 includes the positive connector 33 on which metal is exposed. More specifically, the end of the positive current collector 31 opposite to the negative connector 23 of the negative current collector 21 in the width-wise direction W of the electrode body 12 is used as the positive connector 33.

The lamination is obtained by stacking the negative plate 2 and the positive plate 3 with the separator 4 disposed between the negative plate 2 and the positive plate 3. The lamination is rolled about the roll axis in the longitudinal direction and then is shaped to have a low profile. This forms the rolled-type electrode body 12.

In the present embodiment, the insulation protective layer 34 is disposed on the positive current collector 31 adjacent to the positive connector 33 of the positive composite material layer 32. More specifically, in the present embodiment, the insulation protective layer 34 is disposed on the positive current collector 31 adjacent to the positive connector 33 of the positive current collector 31 in the width-wise direction W of the electrode body 12. As in the prior art, when the insulation protective layer 34 is not included, the positive current collector 31 is exposed from an end a of the positive composite material layer 32 that is located toward the positive connector 33. In this case, from the end a to an end b of the negative composite material layer 22 that is located at the positive electrode side, the positive current collector 31 and the negative composite material layer 22 are opposed to each other via the separator 4. In this structure, metal particles may collect on this location, or metal lithium (Li) dendrites may develop on the negative composite material layer 22. If such substances pass through the separator 4, a micro-short circuit may be formed between the negative composite material layer 22 and the positive current collector 31. This causes heat generation and self-discharging. In the present embodiment, the insulation protective layer 34 is disposed from the end a to an end c over the end b. The insulation protective layer 34 limits such micro-short circuits.

Electrolytic Solution 13

The electrolytic solution 13 of the lithium-ion rechargeable battery is nonaqueous and includes a composition in which a lithium salt is dissolved in an organic solvent. Examples of the lithium salt include $LiClO_4$, $LiPF_6$, $LiAsF_6$, $LiBF_4$, or $LiSO_3CF_3$. Examples of the organic solvent include cyclic carbonates such as ethylene carbonate, propylene carbonate, butylene carbonate and trifluoropropylene carbonate; chain carbonates such as diethyl carbonate, dimethyl carbonate, ethyl methyl carbonate, and dipropyl carbonate; ether compounds such as tetrahydrofuran, 2-methyltetrahydrofuran, and dimethoxyethane; sulfur compounds such as ethyl methyl sulfone and butane sultone; and phosphorus compounds such as triethyl phosphate and trioctyl phosphate. The electrolytic solution may be obtained by mixing one or more of the above elements. The composition of the electrolytic solution 13 is not limited to that described above.

Components of Electrode Body 12

The negative plate 2, the positive plate 3, and the separator 4 are the components of the electrode body 12 and will now be described.

In the present embodiment, the term "average size" refers to the median size (D50:50% volume-average particle size) corresponding to 50% of accumulation in a volume-based particle size distribution, unless otherwise specified. When the average particle size is in a range of approximately 1 μm or greater, laser diffraction and light scattering process may be used to obtain the average particle size. When the average particle size is in a range of approximately 1 μm or less, a dynamic light scattering (DLS) process may be used to obtain the average particle size. The average particle size based on the DLS process may be measured in accordance with JISZ8828:2013.

Negative Plate 2

The negative plate 2 is obtained by forming the negative composite material layers 22 on opposite surfaces of the negative current collector 21, which serves as the negative base. In the embodiment, the negative current collector 21 is formed of a copper (Cu) foil. The negative current collector 21 is a base as the aggregate for the negative composite material layer 22 and is also a current collecting member that collects electricity from the negative composite material layer 22. In the present embodiment, the negative active material is a material capable of storing and releasing lithium ions and is powder of a carbon material such as graphite.

The negative plate 2 is formed by, for example, mixing the negative active material, solvent, and binder, coating the negative current collector 21 with the mixed paste of the negative composite material, and drying the negative composite material paste.

Positive Plate 3

The positive plate 3 includes the positive current collector 31 and the positive composite material layer 32 and the insulation protective layer 34 applied to the positive current collector 31.

Positive Current Collector 31

The positive plate 3 is obtained by forming the positive composite material layers 32 on opposite surfaces of the positive current collector 31, which serves as the positive substrate. In the embodiment, the positive current collector 31 is formed of an aluminum (Al) foil. The positive current collector 31 is a base as the aggregate for the positive composite material layer 32 and is also a current collecting member that collect electricity from the positive composite material layer 32.

In the embodiment, the positive substrate forming the positive current collector 31 is formed of the Al foil. For example, the positive substrate forming the positive current collector 31 is formed of a conductive material including a metal having good conductivity. Examples of the conductive material may be a material including aluminum and a material including an aluminum alloy. The structure of the positive current collector 31 is not limited to that described above.

Positive Composite Material Layer 32

Figure 5:
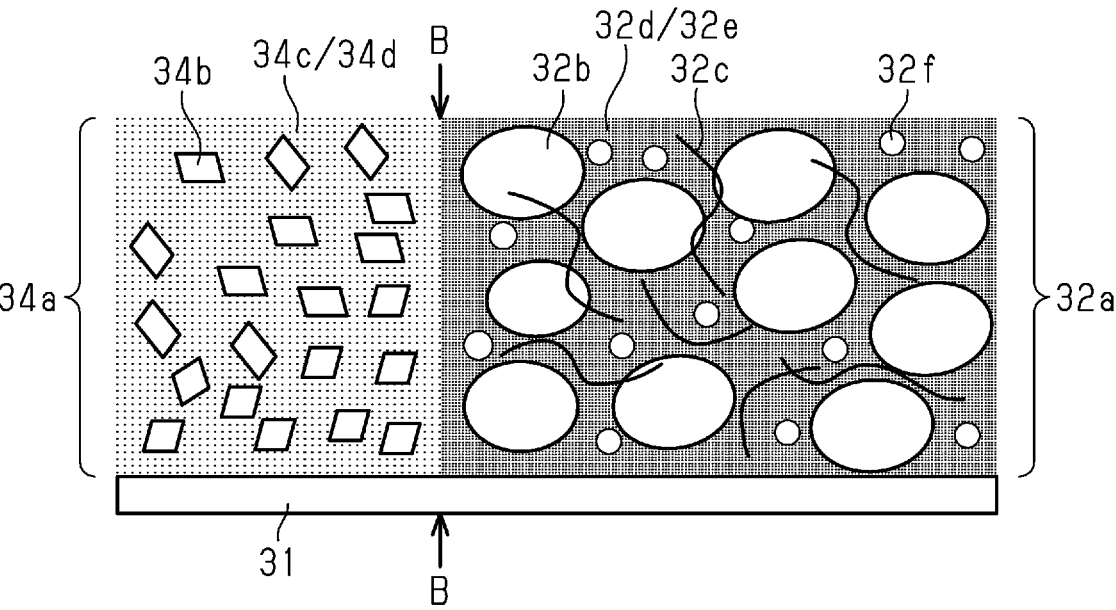
FIG. 5 is a schematic diagram showing a boundary portion between a positive composite material layer and an insulation protective layer in a coating step of the embodiment.

FIG. 5 is an enlarged schematic diagram of section A shown in FIG. 3 showing the boundary portion B between the positive composite material layer 32 and the insulation protective layer 34 in a coating step (S3) of the present embodiment. The positive composite material layer 32 will be described with reference to FIG. 5. The positive composite material layer 32 is obtained by coating the positive current collector 31 with the positive composite material paste 32a and drying the positive composite material paste 32a. The positive composite material layer 32 includes the conduction support 32c, a binder 32d, and an additive agent such as a dispersant in addition to the positive active material particles 32b.

Positive Composite Material Paste 32a

The positive composite material paste 32a is obtained by adding a solvent 32e and the acetic acid 32f to the conduction support 32c, the binder 32d, and the additive agent such as the dispersant in addition to the positive active material particles 32b to form a paste. In the coating step (S3) shown in FIG. 4, the positive composite material paste 32a is applied to the positive current collector 31 to form the positive composite material layer 32. Subsequently, in the drying step (S4), the positive composite material paste 32a is dried and adhered in a solid phase. At the stage of the positive composite material paste 32a shown in FIG. 5, the acetic acid 32f and the solvent 32e are mixed with the positive composite material paste 32a. However, after the drying step (S4), the acetic acid 32f and the solvent 32e are volatilized and disappear from the positive composite material layer 32.

Composition of Positive Active Material Particles 32b

The positive active material particles 32b include a primary particle that contains lithium-transition metal oxide having a layered crystalline structure. The lithium-transition metal oxide includes one or a predetermined number of transition metal elements in addition to Li. Preferably, the transition metal element included in the lithium-transition metal oxide is at least one of Ni, Co, and Mn. A preferred example of the lithium-transition metal oxide includes all of Ni, Co, and Mn.

The positive active material particles 32b may additionally include one or more kinds of elements other than a transition metal element (i.e., at least one of Ni, Co, and Mn). The additional element may include any element in the periodic table belonging to group 1 (alkali metals such as sodium), group 2 (alkaline earth metals such as magnesium and calcium), group 4 (transition metals such as titanium and zirconium), group 6 (transition metals such as chromium and tungsten), group 8 (transition metal such as iron), group 13 (semi-metal such as boron or metal such as aluminum), and group 17 (halogen such as fluorine).

In a preferred embodiment, the positive active material particles 32b may have the composition (average composition) expressed by the following general expression (1).

$$\mathrm{Li}_{1+x}\mathrm{Ni}_y\mathrm{Co}_z\mathrm{Mn}(1\text{-}y\text{-}z)\mathrm{MA}\alpha\mathrm{MB}\beta\mathrm{O}_2$$

In expression (1), x may be a real number that is greater than or equal to 0 and less than or equal to 0.2, y may be a real number that is greater than 0.1 and less than 0.6, and z may be a real number that is greater than 0.1 and less than 0.6. In expression (1), MA represents at least one of metal elements selected from W, Cr, and Mo, and α is a real number that is greater than 0 and less than or equal to 0.01 (typically, greater than or equal to 0.0005 and less than 0.01, and, for example, greater than or equal to 0.001 and less than or equal to 0.01). In expression (1), MB represents one or more of elements selected from a group of Zr, Mg, Ca, Na, Fe, Zn, Si, Sn, Al, B, and F, and β may be a real number that is greater than or equal to 0 and less than or equal to 0.01. Thus, β may be substantially 0. That is, the oxide substantially does not contain MB. In a chemical formula representing the lithium-transition metal oxide having a layered structure, the composition ratio of oxygen (O) is set to 2 for the sake of convenience. However, the numerical value should not be interpreted in a strict manner and may allow slight variation in the composition (typically, in a range of 1.95 or greater and 2.05 or less).

Conduction Support 32c

The conduction support 32c is a material that forms a conductive path in the positive composite material layer 32. An appropriate amount of the conduction support is mixed with the positive composite material layer 32 to increase the conductivity of the positive electrode and improve the charging and discharging efficiency of the battery and the output performance of the battery. Examples of the conduction support include carbon black such as acetylene black (AB) and other materials (e.g., graphite) and a carbon material such as a carbon nanotube. The average particle size of the conduction support is, for example, 0.1 to 0.15 μm.

Binder 32d

In an example, polyvinylidene fluoride (PVdF), polytetrafluoroethylene (PTFE), polyacrylic acid, or polyacrylate may be used as the binder 32d.

Dispersant

Examples of the dispersant include polyvinyl alcohol (PVA), polyvinyl butyral (PVB), polyvinyl pyrrolidone (PVP), polyacrylate, polymethacrylate, polyoxyethylene alkyl ether, polyalkylene polyamine, and benzimidazole.

Structure of Insulation Protective Layer 34

As shown in FIG. 2, in the positive plate 3, the positive composite material layer 32 is formed on the positive current collector 31, and the insulation protective layer 34 is also formed on the positive current collector 31 adjacent to the positive composite material layer 32 at a position opposed to the end of the negative composite material layer 22. More specifically, the insulation protective layer 34 is located adjacent to the end of the positive composite material layer 32 in the width-wise direction W of the electrode body 12 and opposed to the end of the negative composite material layer 22 in the thickness-wise direction of the electrode body 12. In the insulation protective layer 34, the insulation particles 34b are dispersed and stabilized by the binder 32d. The insulation protective layer 34 is obtained by coating the surface of the positive current collector 31 with the insulation protective paste 34a along ends of the positive composite material layer 32 and drying the insulation protective paste 34a. The insulation protective layer 34 includes Na of 150 to 1700 ppm.

Insulation Protective Paste 34a

The insulation protective paste 34a is a paste obtained by liquidizing a binder 34c by adding a solvent 34d and dispersing the insulation particles 34b. In the prior art, a dispersant is added to uniformly disperse the insulation particles 34b in the paste. In the present embodiment, a dispersant is not added, which is a point of distinction.

Figure 4:
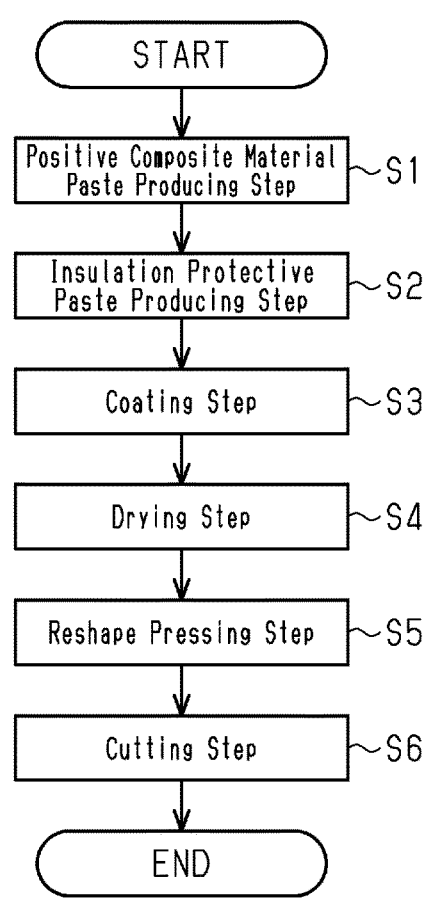
FIG. 4 is a flowchart showing a method for manufacturing a positive plate of the embodiment.

In the coating step (S3) shown in FIG. 4, the insulation protective paste 34a is applied to the positive current collector 31. In the drying step (S4), the insulation protective paste 34a is dried and adhered in a solid phase. This forms the insulation protective layer 34. At the stage of the insulation protective paste 34a shown in FIG. 5, the solvent 32e is mixed with the insulation protective paste 34a. After the dry step (S4), the solvent 32e is volatilized and disappeared from the insulation protective layer 34.

Insulation Particle 34b

The insulation particles 34b are located between the negative composite material layer 22 and the positive current collector 31 for electrical insulation. Examples of the particles include an insulator such as boehmite or alumina. In the present embodiment, boehmite is used.

Boehmite

Boehmite is an aluminum hydroxide (γ-AlO(OH)) mineral and is a component of aluminum ore bauxite. Boehmite exhibits a vitreous or pearly luster. Mohs hardness is 3 to 3.5. The specific gravity is 3.00 to 3.07. Boehmite has high insulating properties, high heat resistance, and high hardness and may be industrially used as an inexpensive flame-retardant additive for a fire-resistant polymer.

Boehmite is expressed by a chemical composition of $AlO(OH)$ or $Al_2O_3 \cdot H_2O$. Boehmite is alumina monohydrate that is chemically stable and is typically produced by heating or hydrothermally treating alumina trihydrate in air. The dehydration temperature of boehmite is relatively high and is 450° C. to 530° C. The producing conditions may be adjusted to control the shape of boehmite into various shapes such as a plate, a needle, or a hexagonal plate. Adjustment of the producing conditions also controls the aspect ratio and the particle size.

There are various conventional processes for producing boehmite. Typically, boehmite is produced by performing hydrothermal treatment on aluminum hydroxide derived from bauxite, which is the raw material. The producing process includes a step of stirring and mixing a slurry obtained by adding water to aluminum hydroxide and a reaction accelerator (metal compound). The producing process also includes a hydrothermal treatment step of wet-curing the slurry while heating the slurry in a steam atmosphere with a pressure vessel. The producing process also includes a dehydrating step, a washing step, a filtering step, and a drying step of the product obtained by the reaction. For example, Japanese Laid-Open Patent Publication Nos. 6-263437 and 2000-86235 may be used as the reference.

In a conventional process for producing boehmite through hydrothermal treatment, hydroxide, oxide, chloride, or sulfate of alkaline earth metal or alkali metal is added to aluminum hydroxide as a reaction accelerator. Therefore, the washing step is essential. However, even after the washing step, impurities derived from the reaction accelerator such as sodium (Na) and calcium (Ca) are likely to remain.

As described above, the pH of boehmite is controlled by controlling the Na component derived from the raw material.

Particle Size of Insulation Particle 34b

As described above, an excessively large average particle size [μm (D50)] adversely affects the dispersion properties. On other hand, an excessively small average particle size [μm (D50)] causes aggregation. In the present embodiment, since a dispersant is not included, the average particle size [μm (D50)] is set to 1 to 3 μm to inhibit aggregation.

pH Adjustment of Insulation Protective Paste 34a

In the present embodiment, the amount of Na in the insulation protective paste 34a is adjusted to 50 to 500 ppm, more preferably, 260 to 355 ppm so that the pH of the insulation protective paste 34a in the original state is adjusted to 10 to 12. For example, when the insulation protective paste 34a contains boehmite of 25 wt %, the amount of Na contained in the boehmite is set to 200 to 2000 ppm, more preferably, 1040 to 1420 ppm. As a result, in a completed rechargeable battery, the amount of Na in the insulation protective layer 34 is 150 to 1700 ppm, more preferably, 800 to 1200 ppm.

Binder 34c

In an example, polyvinylidene fluoride (PVdF), polytetrafluoroethylene (PTFE), polyacrylic acid, or polyacrylate may be used as the binder 34c.

Separator 4

The separator 4 may be a porous resin sheet formed from resin such as polyethylene (PE) or polypropylene (PP) that retains the electrolytic solution 13 between the positive plate 3 and the negative plate 2. The porous resin sheet may have a single-layer structure using a single material or a multi-layer structure using various materials.

Manufacturing Method of Positive Plate 3

FIG. 4 is a flowchart showing a method for manufacturing the positive plate 3 in the present embodiment. The method for manufacturing the positive plate 3 of the present embodiment will now be described with reference to FIG. 4.

Positive Composite Material Paste Producing Step (S1)

Firstly, the positive composite material paste 32a is produced. The detail has been described above.

Insulation Protective Paste Producing Step (S2)

The insulation protective paste 34a is also produced. The detail has been described above.

Coating Step (S3)

The coating step (S3) will now be described. The coating step (S3) is a step of simultaneously applying the positive composite material paste 32a produced in the positive composite material paste producing step (S1) and the insulation protective paste 34a produced in the insulation protective paste producing step (S2) to predetermined positions of the positive current collector 31.

Structure of Coater 5

Figures 7, 8:
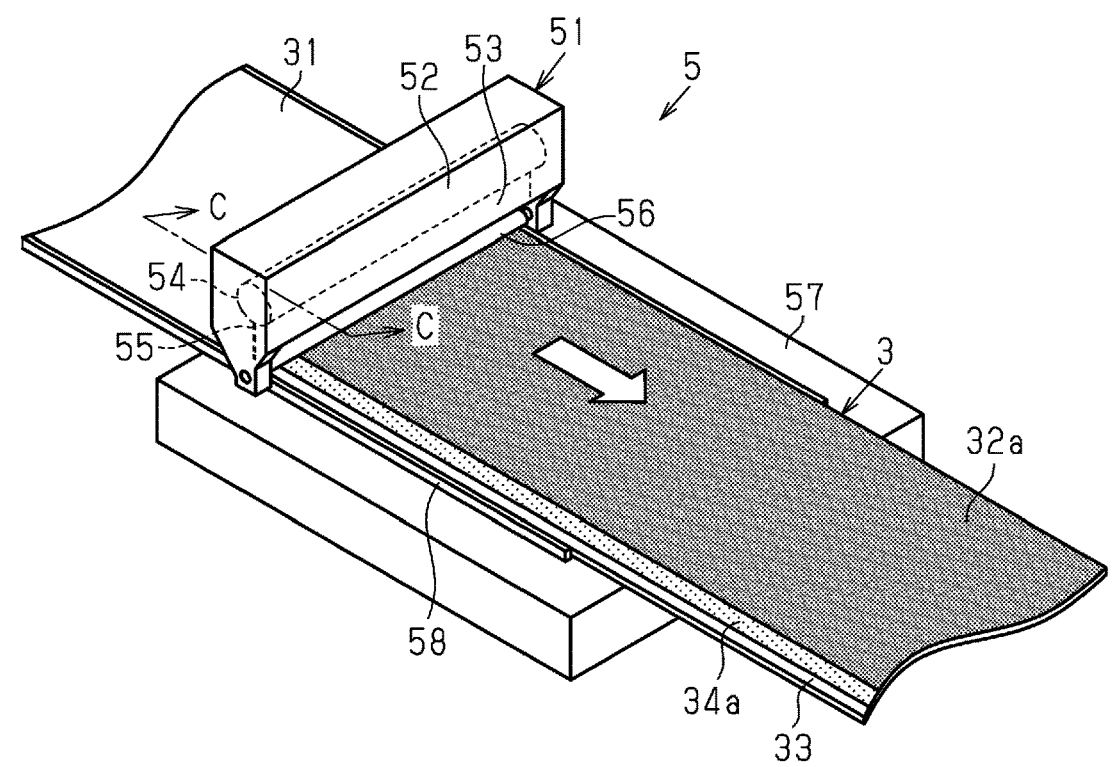
FIG. 7 is a perspective view showing the structure of a coater.
FIG. 8 is a schematic perspective view of a first nozzle and a second nozzle.

FIG. 7 is a perspective view showing the structure of the coater 5. FIG. 8 is a schematic perspective view showing a first nozzle 53 and a second nozzle 55 including a cross section of the coater 5 as viewed from C-C line in FIG. 7. The coater 5 will now be described with reference to FIGS. 7 and 8.

As shown in FIG. 7, the coater 5 includes a stage 57 serving as a base. The stage 57 includes a positioning guide 58 used to convey the positive current collector 31 that is formed of an Al foil and is belt-shaped before being cut. The positive current collector 31 is drawn out from a supply reel (not shown) and is conveyed on the stage 57 by a conveying means. A gate-type die nozzle 51 is disposed on an upstream end of the stage 57 in a conveyance direction of the positive current collector 31 and extends over the positive current collector 31 in a direction orthogonal to the conveyance direction. The die nozzle 51 includes a first die 52 that stores the positive composite material paste 32a. The first die 52 is a cavity located at a position corresponding to the position where the positive composite material layer 32 is formed. The positive composite material paste 32a is supplied from a supplying means (not shown) and is stored in the first die 52. A second die 54 is a cavity located at a position corresponding to the position where the insulation protective layer 34 is formed. The insulation protective paste 34a is supplied from a supplying means (not shown) and is stored in the second die 54. The first die 52 and the second die 54 are collinearly arranged adjacent to each other.

The first nozzle 53 extends from a lower portion of the first die 52 to the position where the positive composite material layer 32 of the positive current collector 31 is formed on the stage 57. When the pressure of the first die 52 is increased by a pressure-applying means (not shown), a predetermined amount of the positive composite material paste 32a is discharged from the first nozzle 53 to the position where the positive composite material layer 32 of the positive current collector 31 is formed.

The second nozzle 55 extends from a lower portion of the second die 54 to the position where the insulation protective layer 34 of the positive current collector 31 is formed on the stage 57. When the pressure of the second die 54 is increased by a pressure-applying means (not shown), a predetermined amount of the insulation protective paste 34a is discharged from the second nozzle 55 to the position where the insulation protective layer 34 of the positive current collector 31 is formed.

As shown in FIG. 8, the first nozzle 53 and the second nozzle 55 are separated from each other. The positive composite material paste 32a discharged from the first nozzle 53 intimately comes into liquid contact with the insulation protective paste 34a discharged from the second nozzle 55 immediately after being discharged. The positive composite material paste 32a, which is in liquid contact with the insulation protective paste 34a, is applied to the position where the positive composite material layer 32 of the positive current collector 31 is formed. Also, the insulation protective paste 34a, which is in liquid contact with the positive composite material paste 32a, is applied to the position where the insulation protective layer 34 of the positive current collector 31 is formed. After being applied, the surfaces of the positive composite material layer 32 and the insulation protective layer 34 are reshaped by a roller 56. When the insulation protective layer 34 has a smaller thickness than the positive composite material layer 32, only the positive composite material layer 32 is reshaped.

Figure 6:
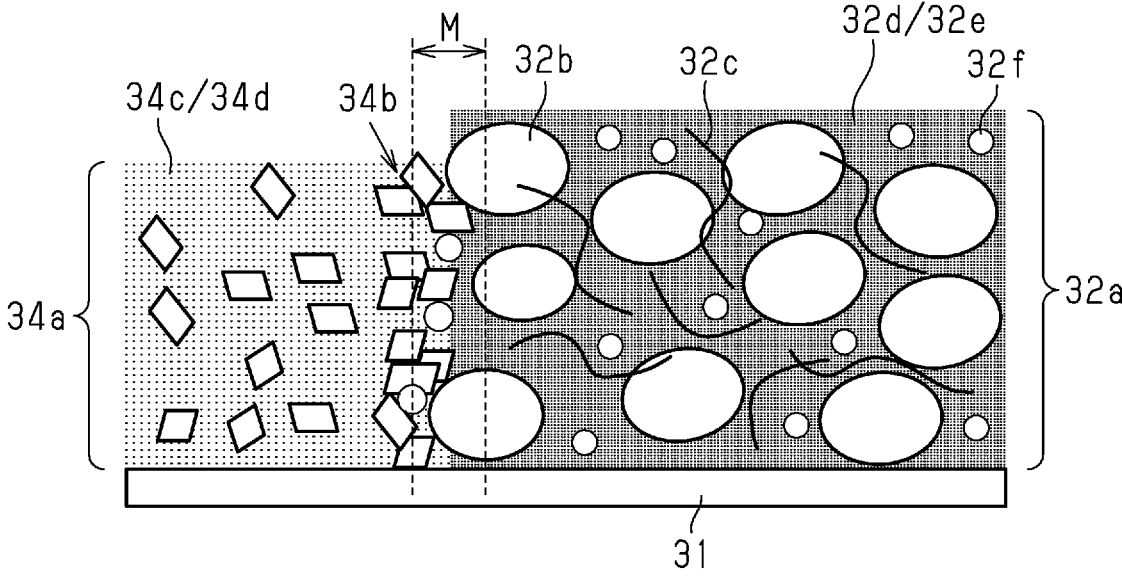
FIG. 6 is a schematic diagram showing the boundary portion between the positive composite material layer and the insulation protective layer after the coating step of the embodiment.

In the coating step (S3) of the positive composite material layer of the present embodiment shown in FIG. 5, the boundary portion B between the positive composite material layer 32 and the insulation protective layer 34 is in liquid contact in the manner described above. As shown in FIG. 6, when the positive composite material paste 32a and the insulation protective paste 34a are in liquid contact with each other, the positive composite material paste 32a and the insulation protective paste 34a are mixed to form the mixed portion M. In this state, the acetic acid 32f of the positive composite material paste 32a lowers the pH value of surrounding portions of the insulation particles 34b in the insulation protective paste 34a from a value of 10 to 12. As a result, the pH of the surrounding portions of the insulation particles 34b becomes 7.7 to 9.4, which is close to the isoelectric point of boehmite. When the pH becomes 7.7 to 9.4, boehmite starts to aggregate, and the apparent particle size of boehmite is increased. Thus, further enlargement of the mixed portion M is stopped.

Drying Step (S4)

As described above, when the mixing of the positive composite material paste 32a and the insulation protective paste 34a is inhibited immediately after the coating step (S3), the drying step (S4) is performed. The drying step (S4) volatilizes the solvent 32e and the acetic acid 32f of the positive composite material layer 32 and solidifies the paste of the positive composite material layer 32. Consequently, the positive composite material layer 32 does not further mix with the insulation protective layer 34. The drying step (S4) also volatilizes the solvent 34d of the insulation protective layer 34 and solidifies the paste of the insulation protective layer 34. Consequently, the insulation protective layer 34 does not further mix with the positive composite material layer 32. The insulation protective layer 34 and the positive composite material layer 32 are stable in this state.

Reshape Pressing Step (S5)

When the drying step is completed, the positive composite material layer 32 and the insulation protective layer 34 each have a certain hardness. However, in the reshape pressing step (S5), a pressing machine (not shown) is used to reshape the surfaces so that the surfaces are flat and have a uniform thickness. In the present embodiment, the insulation protective paste 34a has a smaller solid content rate NV than the positive composite material paste 32a. Therefore, the insulation protective paste 34a is decreased in volume at a greater rate as a result of volatilization of volatile components in the drying step (S4). Thus, after the drying step (S4), the insulation protective layer 34 has a smaller thickness than the positive composite material layer 32. As a result, in the reshape pressing step (S5), only the positive composite material layer 32 is reshaped by the pressing machine.

Cutting Step (S6)

After the surfaces are flattened and have a uniform thickness in the reshape pressing step (S5), the cutting step (S6) performs cutting to obtain a length corresponding to the electrode body 12.

Thus, the positive plate 3 is completed.

Manufacturing Method of Vehicle Battery Pack

When the positive plate 3 is completed through the manufacturing method of the positive plate 3, the negative plate 2 and the positive plate 3 are stacked on one another with the separator 4 disposed between the negative plate 2 and the positive plate 3 to form a lamination, and the lamination is rolled to manufacture the electrode body 12. Subsequently, the positive external terminal 14 and the negative external terminal 15 are coupled to the electrode body 12 through a lid of the battery case 11. The electrode body 12 is accommodated in the battery case 11, and the lid is hermetically joined by laser beam welding or the like. After a drying step, in a solution adding step, the battery case 11 is filled with the electrolytic solution 13, and the battery case 11 is sealed. Subsequently, conditioning such as initial charging, an open circuit voltage (OCV) test, an internal resistance test, and aging are performed. Thus, a cell battery is completed. Two or more cell batteries are stacked to form an assembled battery. Further, two or more assembled batteries are accommodated in a battery pack. When the battery pack is provided with a controller that performs control by monitoring charging and discharging and the like, the battery pack is completed as a vehicle on-board lithium-ion rechargeable battery.

Operation of Present Embodiment

In the lithium-ion rechargeable battery of the present embodiment, the simultaneous coating is performed in the coating step (S3). In this step, when the positive composite material paste 32a comes into liquid contact with the insulation protective paste 34a in the boundary portion B, the insulation particles 34b, which are formed of boehmite included in the insulation protective paste 34a, are aggregated to increase the apparent particle size. This inhibits entrance of the insulation particles 34b into space between the positive active material particles 32b and the conduction support 32c and entrance of the positive active material particles 32b and the conduction support 32c into space between the insulation particles 34b, thereby limiting formation of the mixed portion M.

In this regard, acetic acid 32f is added to the positive composite material paste 32a as a pH adjuster so that when the positive composite material paste 32a comes into liquid contact with the insulation protective paste 34a in the boundary portion B, boehmite is aggregated to increase the apparent particle size. The acetic acid 32f of the positive composite material paste 32a causes the pH of the insulation protective paste 34a of the boundary portion B to become closer to the isoelectric point. This allows boehmite to aggregate and inhibits the mixing.

Effects of Present Embodiment (1) In the present embodiment, even when the positive composite material paste 32a and the insulation protective paste 34a are simultaneously applied, the positive plate 3 that inhibits the mixing of the positive composite material layer 32 and the insulation protective layer 34 in the boundary portion B is manufactured.

(2) The insulation protective paste 34a for forming the insulation protective layer 34 is produced to have a pH that is adjusted corresponding to a zeta potential at which the insulation particles 34b do not aggregate. Thus, in the coating step (S3), the insulation particles 34b are uniformly dispersed and applied.

(3) The insulation particles 34b include boehmite, and the pH of insulation protective paste is adjusted to 10 to 12. This ensures avoidance of the isoelectric point, at which boehmite aggregates.

(4) The average particle size of boehmite in the insulation protective paste 34a is set to 1 to 3 μm. The insulation protective paste 34a does not include a dispersant. Thus, until the coating step (S3), the particle size that is set to inhibit aggregation ensures inhibition of aggregation. After the coating step (S3), the aggregation is not interfered with by a dispersant.

(5) The amount of Na contained in the insulation protective paste 34a is set to 50 to 500 ppm. Thus, the pH is adjusted to appropriately inhibit the aggregation until the coating step (S3).

(6) The pH adjuster of the positive composite material paste 32a includes the acetic acid 32f. This ensures aggregation of the insulation particles 34b when the acetic acid 32f comes into liquid contact with the insulation protective paste 34a. In addition, the acetic acid 32f in the positive composite material paste 32a produces nonaqueous electrolyte rechargeable batteries that output excellent output at a low temperature at a high productivity.

(7) The pH of the positive composite material paste 32a is adjusted to 7 to 9. This ensures aggregation of the insulation particles 34b when the acetic acid 32f comes into liquid contact with the insulation protective paste 34a.

(8) The acidity of the positive composite material paste 32a is set to 300 to 800 ppm. This ensures aggregation of the insulation particles 34b when the acetic acid 32f comes into liquid contact with the insulation protective paste 34a.

(9) The present embodiment is suitable for the case of the lithium-ion rechargeable battery 1.

Modified Examples

The drawings are intended to illustrate the invention and do not accurately show the actual size, thickness, number of particles, and the like.

The flowchart shown in FIG. 4 is an example of a method for manufacturing the positive plate 3. The steps may be switched in terms of order, removed, added, and replaced.

The positive active material particles 32b, the conduction support 32c, the binder 32d, the acetic acid 32f (pH adjuster), the insulation particles 34b, and the binder 34c are examples and are not limited to those described in the embodiments.

The lithium-ion rechargeable battery 1 is described as an example of a rechargeable battery. However, the present invention is applicable to other rechargeable batteries as long as the rechargeable batteries include an equivalent electrode body.

The lithium-ion rechargeable battery of the present embodiment is an embodiment of the present invention and is not restrictive. One skilled in the art may add, remove, or change the structure within the scope of the claims.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A method for manufacturing a positive plate of a rechargeable battery, wherein the rechargeable battery includes an electrode body including the positive plate, a negative plate, and a separator that are stacked on one another, the negative plate includes a negative current collector and a negative composite material layer formed on the negative current collector, and the positive plate includes a positive current collector, a positive composite material layer formed on the positive current collector, and an insulation protective layer formed on the positive current collector adjacent to the positive composite material layer at a position opposed to an end of the negative composite material layer, the method comprising:

producing an insulation protective paste that forms the insulation protective layer, the insulation protective paste including insulation particles, a binder, and a solvent and having a pH adjusted corresponding to a zeta potential at which the insulation particles do not aggregate;

producing a positive composite material paste that forms the positive composite material layer, the positive composite material paste including a positive active material, a conduction support, a binder, and a solvent, and a pH adjuster being added to the positive composite material paste to adjust a pH corresponding to a zeta potential at which the insulation particles aggregate; and simultaneously coating the positive current collector with the positive composite material paste and the insulation protective paste so that the insulation protective paste is disposed adjacent to an end of the positive composite material paste.

2. The method according to claim 1, wherein the insulation particles include boehmite, and the pH of the insulation protective paste is adjusted to 10 to 12.

3. The method according to claim 2, wherein the boehmite of the insulation protective paste has an average particle size of 1 to 3 μm, and the insulation protective paste is a dispersant-free insulation protective paste.

4. The method according to claim 2, wherein an amount of sodium (Na) contained in the insulation protective paste is 50 to 500 ppm.

5. The method according to claim 1, wherein the pH adjuster includes acetic acid.

6. The method according to claim 1, wherein the pH of the positive composite material paste is adjusted to 7 to 9.

7. The method according to claim 1, wherein the positive composite material paste has an acidity of 300 to 800 ppm.

\* \* \* \* \*